United States Patent
Halbauer et al.

(10) Patent No.: US 9,060,290 B2
(45) Date of Patent: Jun. 16, 2015

(54) MOBILE NETWORK, CORRESPONDING ACCESS NODE, PROCESSING UNIT AND METHOD FOR OPERATING THE MOBILE NETWORK

(75) Inventors: Hardy Halbauer, Ettlingen (DE); Andreas Rueegg, Stuttgart (DE)

(73) Assignee: Alcatel Lucent, Boulogne-Billancourt (FR)

( * ) Notice: Subject to any disclaimer, the term of this patent is extended or adjusted under 35 U.S.C. 154(b) by 127 days.

(21) Appl. No.: 13/880,652

(22) PCT Filed: Nov. 9, 2011

(86) PCT No.: PCT/EP2011/069716
§ 371 (c)(1),
(2), (4) Date: Apr. 19, 2013

(87) PCT Pub. No.: WO2012/079856
PCT Pub. Date: Jun. 21, 2012

(65) Prior Publication Data
US 2013/0252650 A1  Sep. 26, 2013

(30) Foreign Application Priority Data
Dec. 16, 2010 (EP) .................... 10306424

(51) Int. Cl.
*H04B 7/00* (2006.01)
*H04W 24/02* (2009.01)
(Continued)

(52) U.S. Cl.
CPC ............ *H04W 24/02* (2013.01); *H04W 28/048* (2013.01); *H04W 74/00* (2013.01); *H04W 84/047* (2013.01)

(58) Field of Classification Search
CPC ... H04W 24/02; H04W 28/048; H04W 74/00; H04W 84/047
USPC ........ 455/114.2, 423, 420, 553.1, 419, 552.1, 455/557, 418, 63.1, 278.1, 296, 501, 445; 345/689, 650, 204, 205, 296
See application file for complete search history.

(56) References Cited

U.S. PATENT DOCUMENTS

| 8,422,424 B1* | 4/2013 | VonFeldt et al. ............... 370/328 |
| 2008/0013558 A1* | 1/2008 | Ito et al. ........................ 370/404 |

(Continued)

FOREIGN PATENT DOCUMENTS

| EP | 2 242 298 A1 | 10/2010 |
| WO | WO2009134178 A1 | 11/2009 |

OTHER PUBLICATIONS

ETRI, "Coordinated Multi-Cell Transmission for LTE-Advanced Downlink", 3GPP TSG RAN WG1 Meeting #54 (R1-082896), Aug. 18-22, 2008.

(Continued)

*Primary Examiner* — Dominic E Rego
(74) *Attorney, Agent, or Firm* — Fay Sharpe LLP

(57) ABSTRACT

The present invention relates to a system comprising a processing unit, a plurality of access nodes adapted to communicate with a plurality of mobile terminals and wireless backhaul links adapted to connect said access nodes and a wireless backhaul termination interfacing with a core network, According to the present invention:—said processing unit determining dynamically out of said plurality of access nodes, access nodes to remain unused and, access nodes to be used for supporting communication of said mobile terminals, said determination taking into account at least one optimisation criterion consisting in reducing the interference between active access nodes and mobile terminals; said processing unit determining a mapping between said mobile terminals and said active access nodes,—said wireless backhaul links consisting in point-to-multipoint connections between said wireless backhaul termination and said access nodes.

15 Claims, 2 Drawing Sheets

(51) Int. Cl.
*H04W 74/00* (2009.01)
*H04W 28/04* (2009.01)
*H04W 84/04* (2009.01)

(56) References Cited

U.S. PATENT DOCUMENTS

| | | | |
|---|---|---|---|
| 2008/0130495 A1* | 6/2008 | Dos Remedios et al. | 370/230 |
| 2009/0109939 A1* | 4/2009 | Bhushan et al. | 370/337 |
| 2010/0041411 A1 | 2/2010 | Mallik | |
| 2010/0167717 A1 | 7/2010 | Hafeez et al. | |
| 2010/0297936 A1 | 11/2010 | Nan | |

OTHER PUBLICATIONS

Hoymann et al., "LTE Advanced Self-Backhauling", ComNets-Gebaudes, pp. 79-11, Aachen, Nov. 21, 2008.

Taiwan IPO Search Report, TW App. No. 100142018, Date completed Oct. 8, 2013.

Translation of Korean Office Action, KR10-2013-7007882, issued Mar. 25, 2014, mailed Mar. 28, 2014.

Qualcomm Europe, "Coordinated Multi-Point downlink transmission in LTE-Advanced," $3^{rd}$ Generation Partnership Project (3GPP), 3GPP TSG-RAN WG1 #55, R1-084400, XP050317663, pp. 1-6, Prague, Czech Republic, Nov. 10-15, 2008.

Christian Hoymann et al., "A Self-backhauling Solution for LTE-Advanced," Wireless World Research Forum, XP002540105, pp. 1-5, Oct. 13, 2008.

Yang Yang et al., "Relay Technologies for WiMAX and LTE-Advanced Mobile Systems," IEEE Communications Magazine, vol. 47, No. 10, XP011283322, pp. 100-105, Oct. 1, 2009.

International Search Report for PCT/EP2011/069716 dated Dec. 14, 2011.

* cited by examiner

MOBILE NETWORK, CORRESPONDING ACCESS NODE, PROCESSING UNIT AND METHOD FOR OPERATING THE MOBILE NETWORK

BACKGROUND OF THE INVENTION

The present invention relates to the field of telecommunication, and more specifically to a mobile network.

The usual known mobile radio communication networks are systems based on a cellular architecture. Such systems reach from the 2nd generation GSM networks, through $3^{rd}$ generations CDMA, UMTS networks or their evolutions, through $4^{th}$ generation LTE or LTE-Advanced networks. The principle of such systems relies on the fact that a plurality of base stations is spread in such a way that they offer contiguous radio coverage in a predefined zone. Each base station is overlooking a cell, the size of this cell depends on several factors as for example but not restricted to the maximum radiating power used at the transmitters' antenna(s) to communicate with terminals in the cell. When a terminal is willing to establish a communication with the network, it first identifies in which cell it is located and a network admission procedure is performed by the base station of the corresponding cell.

FIG. 1 represents a simplified illustration of a known cellular communication network. The represented cellular network illustrates base stations and terminals located in the coverage area of one of the base stations and consequently communicating with this base station. The principle of a cellular network is that the base stations are serving the terminals located in their cell while the cells are having a predefined size. The backhaul links establishing a connection between the base stations and the core network or the enhanced packet core as defined in 3GPP may be wired links or wireless links in the form of point to point connections.

Performance of such cellular networks and especially of the newest LTE-Advanced networks has reached a limit which can be overcome only partially and with a high amount of additional processing complexity by using techniques as joint processing COMP (Cooperative Multi Point) or MIMO (Multiple Input Multiple Output). The most challenging part in a cellular network consists in the cell edge where the interference situation prevents it from obtaining a good quality of service.

Achieving qualitative good user experience at cell edge is proving difficult even with advanced features like joint processing COMP or network MIMO, and introduces high complexity in the network while a large amount of data have to be exchanged between different base stations for coordination purpose at the cost of the user data throughput.

A particular object of the present invention is to provide a new mobile network infrastructure for coping with the above mentioned shortcomings.

Another object of the invention is to provide network nodes, a processing unit and a method for operating the mobile network.

SUMMARY OF THE INVENTION

The present invention is directed to addressing the effects of one or more of the problems set forth above. The following presents a simplified summary of the invention in order to provide a basic understanding of some aspects of the invention. This summary is not an exhaustive overview of the invention. It is not intended to identify key or critical elements of the invention or to delineate the scope of the invention. Its sole purpose is to present some concepts in a simplified form as a prelude to the more detailed description that is discussed later.

These objects presented above, and others that appear below, are achieved in particular by a system according to claim 1, a processing unit according to claim 9, and a method according to claim 11.

The present invention presents a solution for establishing a wireless network which is no more cell-oriented. Instead, the mobile network is set up according to user requirements and location. Serving access nodes are assigned dynamically while the network architecture is adapted dynamically to user requirements.

A dynamic wireless backhaul system connects dynamically only those access nodes which are needed to serve the active users with maximum throughput while generating minimum interference.

This concept implements dynamic backhauling, where the access nodes do not have a predefined cellular coverage or fixed assignment to a specific area, and are controlled by processing unit 24 overseeing a part of the mobile network.

According to the present invention, the mobile network comprises a processing unit which has the functionality of determining which ones out of the available access nodes need to be active and which ones do not need to be used for serving the terminals requesting communication with the network. This determination is performed dynamically so as to take into account the evolving landscape of terminals and requested communication types and/or services.

The processing unit is further responsible for determining a mapping between the terminals and the access nodes which should serve the terminals. This mapping is dynamic and aligned to the previous determination of the active and unused access nodes. This mapping does not rely on the usual (eg. hexagonal) cell boundaries.

Further the processing unit manages point-to-multipoint wireless backhaul links between the access nodes and a wireless backhaul termination unit. The management of the wireless backhaul links is preferably dynamic and takes into account the determination of active and unused access nodes. Backhaul links are then controlled to serve only the active access nodes with the necessary capacity and an adapted transmission scheme, possibly out of a set of adaptive multi-antenna transmission schemes.

In a further embodiment, the backhaul links and the access links are in different frequency bands so that the operation of the ones does not interfere with the operation of the seconds.

In a still further embodiment, the backhaul links and the access links are in the same frequency band so that the processing unit should take into account inter backhaul/access interference while choosing the active and unused access nodes in addition to the mere terminal landscape.

The method according to the present invention presents the advantage to provide for very agile mobile network architecture able to adapt quickly while ensuring lowest interference possible and hence saving energy, increasing the network throughput especially the cell-edge throughput, the spectral efficiency, the network availability.

Another advantage of the present invention consists in providing an adaptive link management not only in the access part of the network but also in the wireless backhaul part of the network, allowing more flexible and cost-effective deployments and saving energy during operation of the network.

Further advantageous features of the invention are defined in the dependent claims.

BRIEF DESCRIPTION OF THE DRAWINGS

Other characteristics and advantages of the invention will appear on reading the following description of a preferred embodiment given by way of non-limiting illustrations, and from the accompanying drawings, in which.

DETAILED DESCRIPTION OF THE INVENTION

The functions of the various elements shown in the Figures, including any functional blocks may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor", "controller" or "unit" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non volatile storage. Other hardware, conventional and/or custom, may also be included. Similarly, any boxes shown in the Figures are conceptual only. Their function may be carried out through the operation of program logic, through dedicated logic, through the interaction of program control and dedicated logic, or even manually, the particular technique being selectable by the implementer as more specifically understood from the context.

Figure 1:
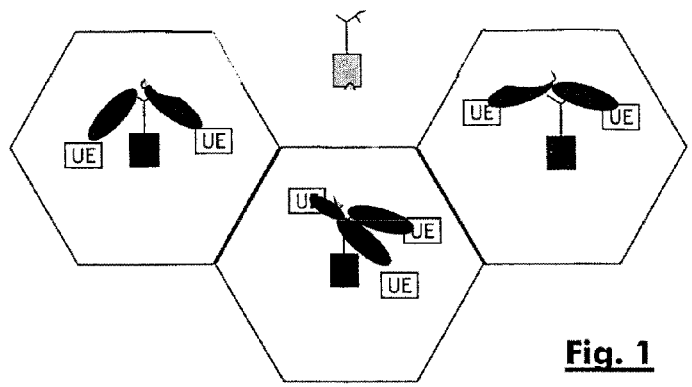
FIG. 1 shows a prior art cellular network.

FIG. 1 has already been described in connection with the prior art.

Figure 2:
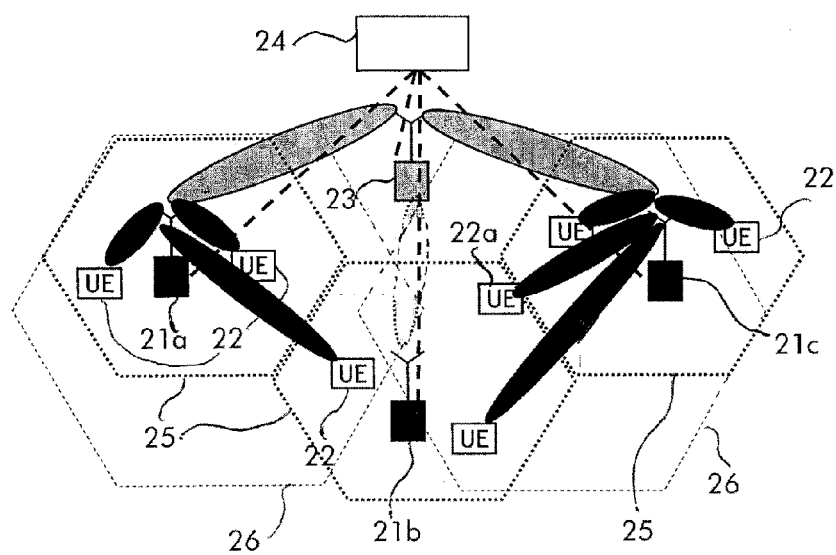
FIG. 2 shows an embodiment of a mobile network according to the present invention.

FIG. 2 shows an embodiment of a mobile network according to the present invention. The mobile network comprises access nodes 21, terminals 22, wireless backhaul termination 23 and processing unit 24. Terminals 22 are connected through wireless access links to access nodes 21, which are themselves connected through point-to-multipoint backhaul links to wireless backhaul termination 23.

Terminals 22 may be any kind of fixed or mobile user equipments having a radio transceiver adapted to be connected to an access node 21.

Access nodes 21a, 21b, 21c may be usual base stations, femto base stations, metro base stations, relay nodes, remote radio heads, a mixture of them or any kind of equivalent equipment adapted to establish a connection between a user terminal and the mobile network. Access nodes 21a, 21b, 21c may use single antenna systems but could advantageously use adaptive multiple antennas transmission systems for reaching terminals 22.

Wireless backhaul termination 23 is a piece of equipment adapted to generate point-to-multipoint links towards access nodes 21. Wireless backhaul termination 23 preferably interfaces the radio access part of the network with the core network (not represented). The wireless backhaul is organized as point-to-multipoint network (e.g. at 30-80 GHz). The use of self-adapting beamforming arrays to connect to access nodes 21a, 21b, 21c is advantageous.

The transceiver of wireless backhaul termination 23 preferably comprises an adaptive multiple-antenna system which enables it to create beams oriented toward access nodes 21a, 21b, 21c to be served by using adapted transmitting weights at the multiple antenna systems. This beamforming might be in a two-dimensional (depending on the azimuth) or three dimensional (depending on the azimuth and the elevation) way. In a preferred embodiment, the adaptive multi-antenna system is used adaptively to selectively generate beams only toward a subset of access nodes 21a, 21c which have been selected by the processing unit 24 according to the present invention to be active.

Wireless backhaul termination preferably considers information from processing unit 24 to schedule backhaul traffic, define appropriate adaptive multi-antenna transmission schemes is applicable and calculate antenna weights.

In a still preferred embodiment, adaptive modulation may be used on the backhaul links. This presents especially the advantage to better manage constraints related to the mobile terminal distribution and the interference situation.

The point-to-multipoint links may transmit through a single transmitter the same data flow to a plurality of access nodes 21a, 21b, 21c which will in their turn extract out of the data flow the data addressed to them and/or the data they need for their functioning (either single antenna systems as well as a multiple antenna systems at wireless backhaul termination 23 may be adapted to perform this embodiment). Alternatively, wireless backhaul termination 23 may selectively transmit through point-to-multipoint backhaul links different data flow to different access nodes 21a, 21b, 21c using techniques as SDMA (space division multiple access). In this case multiple antenna systems at wireless backhaul termination 23 are mandatory.

In the present embodiment only one wireless backhaul termination has been assumed. It will nevertheless be understood by those skilled in the art that more than one wireless backhaul termination may be present in the mobile network, each wireless backhaul termination being responsible to establish backhaul wireless links to a set of access nodes. The allocation between one wireless backhaul termination and a set of access node might preferably be dynamic.

In a first embodiment of the invention, the frequency band used by the backhaul links toward access node 21a, (21b), 21c is different from the frequency band used for the access links between access nodes 21a, (21b,) 21c and terminals 22. A possible implementation would be to use the 2.5 GHz frequency band for the access links while using frequency bands in the 30-50 GHz range for the backhaul links.

In another embodiment of the present invention, both backhaul and access links are sharing the same frequency band resulting in interference between the access links and the backhaul links. This interference needs to be taken into account by processing unit 24 while selecting the active access nodes and mapping the terminals to the active access nodes.

In a further embodiment, a combination of wireless and wireline backhaul links between the access nodes and the core network through a backhaul termination is possible.

Processing unit 24 is adapted to determine dynamically out of the plurality of available access nodes 21, access nodes 21b to remain unused and access nodes 21a, 21c to be used for supporting communication of mobile terminals 22. This determination takes into account at least one optimisation criterion reducing the interference between mobile terminals and active access nodes which serve the terminals.

For example, mobile terminals 22a which would, according to prior art, be served by access node 21b would experience high interference from access node 21c.

This is due to the fact that terminal 22a is located at cell edge of access node 21b and 21c considering the usual hexagonal cell structure 25 around access nodes where all access nodes are active and serving the terminals located under their coverage. In the worst case, mobile terminal 22a located at the cell edge of cell 21b and of cell 21c is in a zone of extremely low signal to interference ratio (SINR=0 dB or even less) and cannot be served with a guaranteed quality of service when both access nodes are active. This cell edge situation for terminal 22a is illustrated in FIG. 2 by the smaller hexagons 25 around access nodes 21a, 21b, 21c.

According to the present invention, and to avoid the cell edge drawback, processing unit 24 tests if the interference situation experienced by mobile terminal 22a would be better and the system as a whole would experience less interference if base station 21b would remain unused. Processing unit 24 consequently determines as well an appropriate mapping between the mobile terminals and the active access nodes. The mobile terminals falling under the geographical coverage area of base station 21b are then reallocated and served by neighboring base stations 21a, 21c which themselves remain active.

Preferably, processing unit 24 executes an optimization algorithm to find out the best possible interference situation for the current mobile terminals topology and communication requests.

The optimization algorithm looks for minimizing the interference experienced in the system or in region of the system as a whole.

A possible way for performing the optimization is to select the active nodes and the unused nodes in a way that no mobile terminals are located in a zone where the SINR is below a predefined threshold. This corresponds to the situation where no terminal is located in a cell edge of an access node. This can be illustrated by the fact that the optimization algorithm avoid that terminals are in a region where the signals from the serving cell would be in the range of the interference produced by a neighbor cell. Using this optimization algorithm results in the fact that the size and the geometry of the coverage areas around the active access nodes is changing dynamically.

Cell structure 26 is the result of the fact that access node 21b remains unused and access nodes 21a and 21c are responsible for serving the terminals that would have been served by access node 21b. It will be noted that cell structure 26 is not automatically hexagonal and have only been drawn hexagonal for sake of simplicity. Possibly there are some coverage holes occurring between cells 26 in the system according to the present inventions in regions where no terminals is located. The size of cells 26 is much more oriented at the beams that access nodes generate to ensure coverage to all terminals allocated to them by processing unit 24.

Visually, this results in constantly moving cell edges of the active access nodes taking into account that no users are present or that the traffic demands are low, or on the contrary that users with high demands are available. A user may therefore change attachment to a base station/cell without moving, simply because the system optimization algorithm in the processing unit reorganizes the cellular structure Optionally, more than one of the active access nodes 21a, 21c can be dynamically assigned to one terminal 22a to be served for joint transmission/reception to/from the terminal.

It will be clear for a person skilled in the art that any criterion which directly or indirectly result into an optimization of the interference situation is to be considered as falling under the scope of the present invention.

Especially, if an energy consumption reduction optimization criterion or any other optimization criterion (as for example but not restricted to the ones mentioned hereafter) are contributing to reduce the interference between the active access nodes and the mobile terminals, this should be understood as a criterion to reduce the interference between active access nodes and the mobile terminals.

Further optimization criteria possibly used at processing unit 24 may for example be one or more of the followings: reducing the energy consumption in the radio access network as a whole or in a region thereof, maximizing the throughput to the mobile terminals, optimizing the backhaul capacity, optimizing the energy consumption of the backhaul link.

In a preferred embodiment of the present invention, the size of the geographical zone to be served by an access node changes dynamically based on determinations and optimization processes performed at processing unit 24 at regular time intervals. A frequent update of this assignment of terminals to access nodes according to terminals movement and traffic changes leads to a dynamic non-cellular multi-access node network approach.

In case of more than one wireless backhaul terminations 23 in the mobile network, processing unit 24 might be responsible of allocating a set of access nodes to each of wireless backhaul terminations 23. This allocation might also be dynamic changing from time to time depending on predefined criteria.

When more than one wireless backhaul terminations are available, it could be advantageous to apply a network MIMO type of transmission on the backhaul links.

In one embodiment of the invention, processing unit 24 is a centralized unit controlling wireless backhaul termination 23 and access nodes 21. In an alternative embodiment, processing unit 24 is a distributed function in the mobile network possibly distributed between access nodes 21a, 21b, 21c, wireless backhaul terminations 23 and/or other entities in the core network.

In a preferred embodiment, wireless backhaul links toward the different access nodes 21a, 21b, 21c are dynamically switched on and off depending on the result of the optimization at processing unit 24. In the case represented access node 21a and 21c are active while access node 21b is unused. Consequently the backhaul links toward access nodes 21a and 21b remains established, while wireless backhaul link toward access node 21b is switched off.

Figure 3:
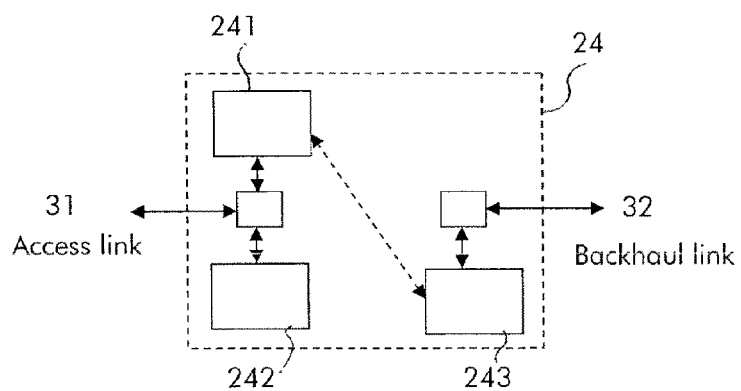
FIG. 3 shows an embodiment of a processing unit according to the present invention.

FIG. 3 shows an embodiment of a processing unit 23 according to the present invention.

Processing unit 24 comprises means 241 for determining dynamically out of a plurality of access nodes, access nodes to remain unused and, access nodes to be used for supporting communication of mobile terminals. The determination takes into account at least one optimisation criterion to reduce the interference between active access nodes and mobile terminals.

Due to the dynamic aspect of the selection of active nodes, it will be clear for a person skilled in the art that a check has to be performed at regular time intervals if a new selection has to be performed. If the mobile terminals are moving quickly or if the channel is changing quickly, the selection might need to be changed after a very short period of time. The trigger point for modifying the selection may be found using different scenario as: reselection at fixed time intervals, reselection upon trigger . . . .

Processing unit 24 further comprises means 242 for determining the mapping between mobile terminals and active access nodes selected by means 241.

Based on the actual user distribution and traffic requirement, means 242 evaluate the assignment of the terminals to the available access nodes in order to optimize some or all of the following criteria:

Minimum interference at terminals due to transmission from different base stations Maximum throughput of the users (e.g. average throughput to the users, cell edge throughput, weighted sum rate, . . . )

Wireless backhaul capacity/Backhaul availability

Interference in wireless backhaul system (between backhaul nodes or from one backhaul node if SDMA communication is used to serve base stations)

Energy consumption

Requested traffic demand of users

Means 242 can assign one terminal to more than one access node in order to obtain joint transmission.

Processing unit 24 further comprises means 243 for dynamically managing point-to-multipoint connections towards access nodes depending on which of the access nodes have been selected to be active access nodes by means 241.

Alternatively, means 243 may manage point-to-multipoint connections towards the access nodes depending on the required backhaul capacity for serving said active access nodes. It will be clear for a person skilled in the art that means 243 can also manage the point-to-multipoint connections depending on both previously mentioned criteria.

In a preferred embodiment of the present invention, means 241 receives information from said access nodes to be able to perform the selection. This information may comprise measurements of channel quality towards a terminal by the different access nodes, the (estimated) number of access node and/or the (estimated) position of the access nodes located in the neighbourhood of the access nodes, information on neighbouring other access nodes and user parameters. This information is obtained by the access nodes for example by uplink signal processing or evaluation of control information sent by the terminals via an appropriate control channel.

Figure 4:
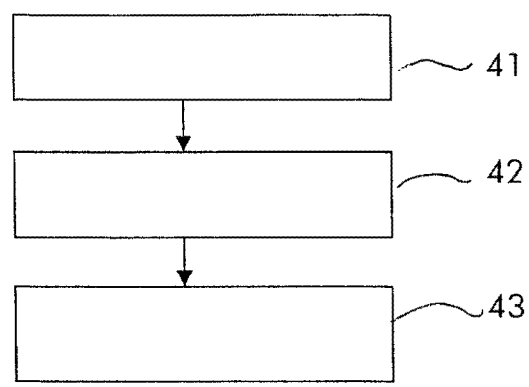
FIG. 4 shows an embodiment of the method for operating the mobile network according to the present invention.

FIG. 4 shows an embodiment of the method for operating the mobile network comprising a plurality of access nodes adapted to communicate with a plurality of mobile terminals, and wireless backhaul links adapted to connect access nodes and a wireless backhaul termination interfacing with a core network. The method comprises following steps:

Step 41 consists in determining dynamically out of the plurality of access nodes, access nodes to remain unused and, access nodes to be used supporting communication with mobile terminals, the determination taking into account at least one optimisation criterion to reduce the interference between active access nodes and mobile terminals.

Step 41 can be further refined in that other optimization criteria can be applied in addition. Example for such optimization criteria are: reducing the energy consumption in the radio access network, maximizing the throughput to said mobile terminals, optimizing the backhaul capacity, optimizing the energy consumption of the backhaul links.

The determination at step 41 is preferably based on information received from the access node and/or from the terminal which may report information on the number of user terminals in a zone and/or the position of the terminal, further measurements as SINR/BER measurements reported on a feedback channel in the uplink may as well be used as basis for an appropriate determination of the access nodes to be used and the ones which may remain unused.

Step 42 consists in determining a mapping between mobile terminals and active access nodes.

Preferably, the determination of active access nodes at step 41 and the mapping of mobile terminals to active access nodes are done in such a way that ensure that for each terminal the SINR is higher than a predefined threshold. The bad performance of cell edges is then avoided.

Step 43 consists in establishing wireless backhaul links consisting in point-to-multipoint connections between the wireless backhaul termination and access nodes. Step 43 preferably only establishes wireless backhaul links towards active nodes.

It will be clear for a person skilled in the art that the three steps 41, 42, 43 may not be executed sequentially but may be all interconnected to exchange information among them.

Iteration between the functions may also be a possibility to still improve the results.

The invention claimed is:

1. A system comprising a processing unit, a plurality of access nodes adapted to communicate with a plurality of mobile terminals and wireless backhaul links adapted to connect said access nodes and at least one wireless backhaul termination interfacing with a core network,
    said processing unit determining dynamically out of said plurality of access nodes, access nodes to remain unused and, active access nodes to be used for supporting communication of said mobile terminals, said determination taking into account at least one optimisation criterion reducing interference between active access nodes and mobile terminals,
    said processing unit determining a mapping between said mobile terminals and said active access nodes,
    said wireless backhaul links consisting in point-to-multipoint connections between said at least one wireless backhaul termination and said access nodes.

2. The system according to claim 1, wherein said processing unit dynamically manages said point-to-multipoint connection depending on which of said access nodes are active access nodes and/or depending on the required backhaul capacity for serving said active access nodes.

3. The system according to claim 1, wherein adaptive multi-antenna transmission is used on said backhaul links.

4. The system according to claim 1, wherein adaptive modulation is used on said backhaul links.

5. The system according to claim 1, wherein said access nodes are one of the following: base stations, relay nodes, small nodes, radio heads.

6. The system according to claim 1, wherein said active access nodes use adaptive multi-antenna transmission for reaching their assigned mobile terminals.

7. The system according to claim 1, wherein the backhaul links and the access links are operated in different frequency bands.

8. The system according to claim 1, wherein the backhaul links and the access links are operated in the same frequency band.

9. A processing unit for use in a mobile communication network comprising a plurality of access nodes adapted to communicate with a plurality of mobile terminals and wireless backhaul links adapted to connect said access nodes and at least one wireless backhaul termination interfacing with a core network, said processing unit comprising:
    at least one processor configured to determine dynamically out of said plurality of access nodes, access nodes to remain unused and, access nodes to be used for supporting communication of said mobile terminals, said determination taking into account at least one optimisation criterion reducing the interference between active access nodes and mobile terminals;

the at least one processor configured to determine the mapping between said mobile terminals and said active access nodes; and the at least one processor configured to dynamically manage said point-to-multipoint connection depending on which of said access nodes are active access nodes and/or depending on the required backhaul capacity for serving said active access nodes.

10. The processing unit according to claim 9, being distributed partly in said access nodes.

11. A method for operating a mobile network comprising a plurality of access nodes adapted to communicate with a plurality of mobile terminals, and wireless backhaul links adapted to connect said access nodes and a at least one wireless backhaul termination interfacing with a core network, said method comprising:

using at least one processor, determining dynamically out of said plurality of access nodes, access nodes to remain unused and, access nodes to be used supporting communication with said mobile terminals, said determination taking into account at least one optimisation criterion reducing interference between active access nodes and mobile terminals,;

using the at least one processor, determining a mapping between mobile terminals and active access nodes; and using the at least one processor, establishing wireless backhaul links including point-to-multipoint connections between said at least one wireless backhaul termination and said access nodes.

12. The method according to claim 11, comprising further optimization criteria including at least one of the following: reducing the energy consumption in the radio access network, maximizing the throughput to said mobile terminals, optimizing the backhaul capacity, reducing the energy consumption of the wireless backhaul links are used to determining access nodes to remain unused and active access nodes.

13. The method according to claim 11, wherein the size of the geographical zone to be served by an access node changes dynamically based on the mapping of terminals to access nodes determined at the processing unit.

14. The method according to claim 11, wherein said dynamic determination of access nodes to remain unused and said determination of mapping between mobile terminals and active access nodes ensure that for each terminal the SINR is higher than a threshold.

15. The method according to claim 11, wherein the method further comprises:

evaluating information at access nodes related to the position and/or number of terminals in their neighborhood; and sending said information to said processing unit.

* * * * *